(12) United States Patent
Meijer et al.

(10) Patent No.: US 8,775,677 B2
(45) Date of Patent: Jul. 8, 2014

(54) TRANSPORTABLE WEB APPLICATION

(75) Inventors: Henricus Johannes Maria Meijer, Mercer Island, WA (US); Gary W. Flake, Bellevue, WA (US); Alexander G. Gounares, Kirkland, WA (US); Matthew B. MacLaurin, Woodinville, WA (US); Debi P. Mishra, Bellevue, WA (US); Amit Mital, Kirkland, WA (US); Ira L. Snyder, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1425 days.

(21) Appl. No.: 11/613,235

(22) Filed: Dec. 20, 2006

(65) Prior Publication Data
US 2008/0082693 A1 Apr. 3, 2008

Related U.S. Application Data

(63) Continuation-in-part of application No. 11/536,562, filed on Sep. 28, 2006, now Pat. No. 8,595,356.

(51) Int. Cl.
*G06F 15/16* (2006.01)

(52) U.S. Cl.
USPC .............. 709/247; 709/223; 719/331

(58) Field of Classification Search
USPC .............. 709/223, 246, 247; 719/331
See application file for complete search history.

(56) References Cited

U.S. PATENT DOCUMENTS

| | | | |
|---|---|---|---|
| 5,263,165 A | 11/1993 | Janis | |
| 5,495,576 A | 2/1996 | Ritchey | |
| 5,537,404 A | 7/1996 | Bentley et al. | |
| 5,588,914 A | 12/1996 | Adamczyk | |
| 5,859,972 A | 1/1999 | Subramaniam et al. | |
| 6,064,656 A | 5/2000 | Angal et al. | |
| 6,185,567 B1 | 2/2001 | Ratnaraj et al. | |

(Continued)

FOREIGN PATENT DOCUMENTS

| | | |
|---|---|---|
| EP | 0915595 A2 | 5/1999 |
| EP | 1058429 A1 | 12/2000 |

(Continued)

OTHER PUBLICATIONS

International Search Report and Written Opinion for PCT Application No. PCT/US2007/079610, mailed Nov. 18, 2008, 13 pages.

(Continued)

*Primary Examiner* — David Lazaro
*Assistant Examiner* — Marie Georges Henry
(74) *Attorney, Agent, or Firm* — Dan Choi; Carole Boelitz; Micky Minhas

(57) ABSTRACT

The claimed subject matter provides a system and/or a method that facilitates re-locating a web application associated with a network service utilizing a portion of serialized data. The network service can be any collection of resources that are maintained by a party (e.g., third-party, off-site, etc.) and accessible by an identified user over a network (e.g., WAN, Internet, etc.). An interface component can receive a portion of serialized data with transparent structure related to an application specification. A hydrate component can create a web application independent of a network service based at least in part upon the serialized data, the web application has state within the network service.

16 Claims, 12 Drawing Sheets

(56) References Cited

U.S. PATENT DOCUMENTS

| | | |
|---|---|---|
| 6,195,683 B1 | 2/2001 | Palmer et al. |
| 6,209,039 B1 | 3/2001 | Albright et al. |
| 6,226,260 B1 | 5/2001 | McDysan |
| 6,341,127 B1 | 1/2002 | Katsube et al. |
| 6,409,599 B1 | 6/2002 | Sprout et al. |
| 6,415,288 B1 | 7/2002 | Gebauer |
| 6,434,532 B2 | 8/2002 | Goldband et al. |
| 6,469,991 B1 | 10/2002 | Chuah |
| 6,496,482 B1 | 12/2002 | Kubota |
| 6,620,043 B1 | 9/2003 | Haseltine et al. |
| 6,707,820 B1 | 3/2004 | Arndt et al. |
| 6,745,224 B1 | 6/2004 | D'Souza et al. |
| 6,917,975 B2 | 7/2005 | Griffin et al. |
| 6,961,318 B2 | 11/2005 | Fichou et al. |
| 7,002,926 B1 | 2/2006 | Eneboe et al. |
| 7,020,654 B1 | 3/2006 | Najmi |
| 7,065,041 B2 | 6/2006 | Sen |
| 7,373,377 B2 | 5/2008 | Altieri |
| 7,653,687 B2 | 1/2010 | Reisman |
| 2002/0124053 A1 | 9/2002 | Adams et al. |
| 2003/0105734 A1 | 6/2003 | Hitchen et al. |
| 2003/0187978 A1* | 10/2003 | Nakamura et al. ............ 709/224 |
| 2003/0229623 A1 | 12/2003 | Chang et al. |
| 2004/0049537 A1 | 3/2004 | Titmuss |
| 2004/0068553 A1* | 4/2004 | Davis et al. .................. 709/218 |
| 2004/0068731 A1* | 4/2004 | Davis et al. .................. 719/310 |
| 2004/0076160 A1 | 4/2004 | Phaltankar |
| 2004/0098456 A1 | 5/2004 | Kryzanowski et al. |
| 2005/0033669 A1 | 2/2005 | Stremler et al. |
| 2005/0138419 A1 | 6/2005 | Gupta et al. |
| 2005/0238024 A1 | 10/2005 | Taylor et al. |
| 2005/0262132 A1 | 11/2005 | Morita et al. |
| 2005/0289234 A1 | 12/2005 | Dai et al. |
| 2005/0289536 A1 | 12/2005 | Nayak et al. |
| 2006/0020700 A1 | 1/2006 | Qiu et al. |
| 2006/0031518 A1 | 2/2006 | Jennings |
| 2006/0036904 A1 | 2/2006 | Yang |
| 2006/0041606 A1 | 2/2006 | Sawdon |
| 2006/0048224 A1 | 3/2006 | Duncan et al. |
| 2006/0062161 A1 | 3/2006 | Tang et al. |
| 2006/0068553 A1 | 3/2006 | Thean et al. |
| 2006/0123005 A1 | 6/2006 | Burnett et al. |
| 2006/0136897 A1* | 6/2006 | Laxminarayan et al. ...... 717/168 |
| 2007/0060123 A1* | 3/2007 | Maes ......................... 455/432.1 |
| 2007/0115123 A1 | 5/2007 | Roberts et al. |
| 2007/0136572 A1 | 6/2007 | Chen et al. |
| 2008/0066095 A1* | 3/2008 | Reinoso ........................... 725/28 |

FOREIGN PATENT DOCUMENTS

| | | |
|---|---|---|
| EP | 1376309 A2 | 1/2004 |
| EP | 1524580 A2 | 4/2005 |
| EP | 1564622 A2 | 8/2005 |
| JP | 2001282634 A1 | 10/2001 |
| KR | 10-2004-0038271 A1 | 5/2004 |
| KR | 10-2004-0107152 | 12/2004 |
| KR | 10-2006-057563 A | 5/2006 |
| WO | WO00/08814 A1 | 2/2000 |
| WO | WO2004002107 A1 | 12/2003 |
| WO | 2005022826 | 10/2006 |

OTHER PUBLICATIONS

International Search Report and Written Opinion for PCT Application No. PCT/US2007/079598, mailed Jan. 30, 2008, 10 pages.

Brunner, et al. "Disruption Tolerant Networking" Dagstuhl Seminar Proceedings (2005) NEC Europe Ltd., Network Labooratories, 4 pages.

Fox, et al. "Towards Flexible Messaging for SOAP Based Services" (2004) IEEE, 11 pages.

3 Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29, Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/pdf&identifier=oai:arXiv.org:cs/0502091. Last accessed Sep. 20, 2006.

International Search Report for PCT App No. US 2007/079606 dated Feb. 27, 2008; 10 pages.

\* cited by examiner

TRANSPORTABLE WEB APPLICATION

CROSS REFERENCE TO RELATED APPLICATION(S)

This continuation-in-part application claims the benefit of U.S. patent application Ser. No. 11/536,562 filed on Sep. 28, 2006, entitled "SERIALIZATION OF RUN-TIME STATE." The entirety of which application is incorporated herein by reference.

BACKGROUND

Conventionally, most computational tasks are undertaken upon a client or within a proprietary intranet and/or internet. For instance, through utilization of a software application resident upon the client, data is created, manipulated, and saved upon a hard drive of the client or on an on-site server. Client-side operating systems are employed to manage relationships between users, software applications, and hardware within a client machine, as well as data that is resident upon a connected intranet. As network connectivity has continued to improve, it has become apparent that a more efficient computing model includes lightweight (inexpensive) clients that continuously communicate with $3^{rd}$ party computing devices to achieve substantially similar end results when compared to the conventional computing paradigm.

With the advent of highly sophisticated computer software, hardware, and/or network connectivity, servicing areas associated therewith have stormed into existence in order to meet consumer high-demands. Typically, computational services are undertaken upon a client or within a proprietary intranet. Client-side systems are employed to manage relationships between users, software applications, web applications, services, and hardware within a client machine, as well as data resident upon a respective intranet. However, in addition to client-side systems providing services and/or web applications, off-site systems (e.g., third party) can also provide services in order to improve data capability, integrity, reliability, versioning, security, and mitigate costs associated therewith.

Traditional web developing frameworks utilize various programming paradigms associated with web applications, back-end databases, web server modifications, server side operating systems, etc. which prove to be extremely difficult to manage and/or utilize. For instance, a typical web application can utilize a plurality of disparate programming paradigms associated therewith. Such variety and range in programming associated with web applications can be extremely troublesome for the web application to be compatible and/or portable to disparate environments. For instance, web applications for particular environments may not be capable of deploying in disparate environments based at least in part upon the specifics and/or details embedded within. In other words, web application development and implementation is constricted, limited, and very rigid.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate implementing a web application based on a portion of serialized data allowing the web application to be transportable. A hydrate component can receive a portion of serialized data associated with an application specification that corresponds to a web application via an interface component, wherein the hydrate component can expand and execute a portion of data to construct the web application. The serialized data can be most any suitable data related to a web application that provides sufficient information related to state and functionality of such web application (e.g., user id and state, session state, etc.). In particular, the serialized data can be appended to include host-specific data (e.g., linkage data between layers, network service specific data, cloud service specific data, framework specific data, structure data specific to a host of the web application, etc.) to allow the web application to be utilized within the particular host.

The serialized data can be a transparent structure that allows most suitable network service, cloud service, off-site party, and the like to utilize the web application. In other words, the serialized data that corresponds to the web application can include various layers that are necessary for the web application to be employed, yet still be independent of any particular host to allow for versatility in deployment and/or implementation. For instance, the layers can be, but are not limited to being, related to database, web server, rendering side, display, application layer, client side logic, server side logic, etc. Thus, the hydrate component can construct the web application based at least in part upon the contents of received serialized data, wherein the serialized data is compact, transportable, stream-lined, and includes one of the following: a bare-bone layer associated with the web application; a blueprint for implementing the web application; and a state associated with the web application.

The web application can be implemented within a network service, wherein the network service can refer to most any collection of resources that are maintained by a party (e.g., off-site, on-site, third party, etc.) and accessible by an identified user over a network (e.g., Internet, WAN, etc.). The network service is intended to include most any service, network service, cloud service, collection of resources, etc. and can be accessed by an identified user via a network. In addition, the network service can provide any suitable number of service(s) to any suitable number of user(s) and/or client(s).

In accordance with one aspect of the claimed subject matter, the hydrate component can utilize an analyzer component. The analyzer component can evaluate serialized data and/or application specifications in order to facilitate implementing the web application. The serialized data can be evaluated by the analyzer component to associate the portions of serialized data to corresponding web applications. In addition, the hydrate component can utilize a constructor component that can expand and/or hydrate the serialized data respective to an application specification to yield a web application. For instance, the constructor component can implement and/or hydrate the serialized data based at least in part upon the evaluation ascertained by the analyzer component.

In accordance with another aspect of the subject innovation, the hydrate component can utilize a dehydrate component that facilitates compressing a web application into a compact package including a portion of serialized data associated with an application specification independent of host and/or network service specific data (e.g., linkage data between layers, network service specific data, cloud service specific data, framework specific data, structure data specific to a host of the web application, etc.). Moreover, such compact package of data can be transported to a disparate host and/or entity (e.g., user, computer, network service, cloud service, service, network, machine, etc.) regardless of the various disparities (e.g., framework differences, programming language implemented, settings, configurations, etc.) associated therewith. In particular, such dehydration and re-hydration techniques implemented by the subject innovation facilitate the re-location and/or re-assigning of web applications in the event that a host and/or network service is terminating and/or has terminated. In other aspects of the claimed subject matter, methods are provided that facilitates creating a web application based on an application specification to allow efficient implementation in a network service.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
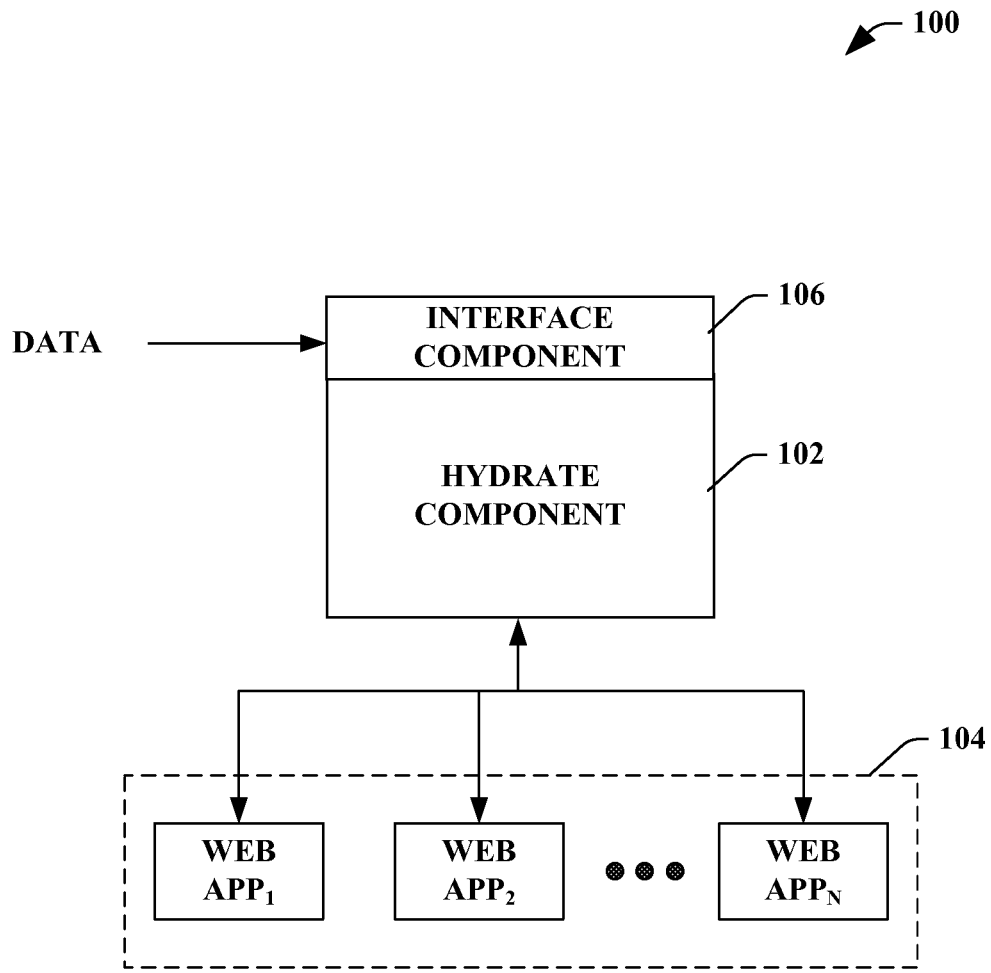
FIG. 1 illustrates a block diagram of an exemplary system that facilitates implementing a web application based on a portion of serialized data allowing the web application to be transportable.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "network," "cloud," "service," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

In addition, a "cloud" is intended to refer to a collection of resources (e.g., hardware and/or software) provided and maintained by an off-site party (e.g., third party), wherein the collection of resources can be accessed by an identified user over a network (e.g., Internet, WAN, . . . ). The resources can provide services including, without limitation, data storage services, word processing services, and many other services and/or applications that are conventionally associated with person computers and/or local servers. Thus, as utilized in the subject innovation, a cloud can provide a network service, a collection of resources, a portion of a service, and the like to at least one identified user. Moreover, such services and/or collection of resources can be specifically tailored to a particular user based on such identification data.

Now turning to the figures, FIG. 1 illustrates a system 100 that facilitates implementing a web application based on a portion of serialized data allowing the web application to be transportable. The system 100 can include a hydrate component 102 that can receive data via an interface component 106 (herein referred to as interface 106 and discussed infra), wherein the hydrate component 102 can implement a web application based at least in part upon the received data. It is to be appreciated that the data can be, but is not limited to, a portion of serialized data related to an application specification, an object related to a programming language, a portion of stream-lined layers that maintain a bond to a web application, a portion of a web application, etc. The hydrate component 102 can expand serialized data related to an application specification to create and execute a web application related therewith. It is to be appreciated that the serialized data can be a transparent structure that allows any suitable network service, cloud service, off-site party, and the like to utilize the web application. In other words, the serialized data that corresponds to the web application (based on the application specification) can include various layers that are necessary for the web application to be employed. For instance, the layers can be, but are not limited to being, related to database, web server, rendering side, display, application layer, client side logic, server side logic, etc. Thus, the serialized data that corresponds to the web application can include various layers that are necessary for the web application to be employed, yet still be independent of most any particular host to allow for versatility in deployment and/or implementation.

Moreover, based on the stream-lined serialized data that can be expanded to initiate the web application, the web application can be contracted back into the serialized data associated with the application specification to facilitate transporting the web application (e.g., employing a "pack-and-go" aspect for the web application). It is to be appreciated that the hydrate component 102 can expand a plurality of web applications 104 based on serialized data received via the interface 106. For example, the hydrate component 102 can create any suitable number of web applications 104 such as web application$_1$, web application$_2$, to web application$_N$, where N is a positive integer.

The system 100 facilitates serializing the state of an application specification to enable seamless integration and/or exportation to various parties (e.g., off-site party, third party, etc.). For example, an application specification and serialized data associated therewith can be expanded by a third party to provide execution and state within a database and/or a third party. After the expansion, execution, and retention of state within the database and/or third party, the data can be contracted for exportation to a disparate third party. In other words, an application specification can be dehydrated and re-hydrated by a third party to provide the web application in the same state that the web application had left-off.

Furthermore, the system 100 allows separation of process (e.g. of the web application) from limitation such that data (e.g., application specification, serialized data, etc.) can be hydrated and dehydrated seamlessly between disparate parties regardless of the various disparities (e.g., framework differences, programming language implemented, settings, configurations, etc.) associated therewith. The process can be separated from limitation utilizing the serialized data associated with the application specification, wherein the serialized data maintains a bond that enables implementation of a particular web application. Moreover, the application specification can include portions associated with generic details related to a database, a web server, a rendering side, a display, an application layer, a client-side logic, a server-side logic, a policy associated with business, etc., wherein such application specification can act like a database with transparent structure. By employing such transparent structure, the application specification can be exported, imported, and/or utilized by various parties, clients, and/or systems.

For example, a network service (not shown) can allow the implementation of at least one web application. The network service can receive serialized data associated with an application specification, wherein based at least in part upon the application specification, the web application can be constructed (e.g., inflated, expanded, hydrated, etc.) to allow such web application to be executed, have state within the network service, and be utilized by various users and/or clients. Furthermore, if most any circumstances arise in relation to the network service terminating (e.g., a retirement, a bankruptcy, a buy-out, a dissolution, the network service dissolving, the network service terminated, the network service terminating, the network service dissolving, filing bankruptcy, a closing, a shut down, a strike, a buyout, the network service ceases to exist, a planned dissolution, a termination of services based on geography, a re-structuring, etc.), most any web applications associated therewith can be transported and implemented in a disparate network service by contracting/compacting (e.g. dehydrating) the web application back into the serialized data related to the application specification and transporting to the disparate network service. Thus, a disparate network service can be identified (e.g., utilizing most any suitable technique to identify a substantially similar network service) to transmit the serialized data allowing continuous and/or uninterrupted utilization of the web application. In other words, the web application is unique by having transparent structure that can be implemented by most any suitable entity (e.g., user, computer, network service, cloud service, service, network, machine, etc.). It is to be appreciated that data migration is not so limited to the circumstance of the network service terminating. For instance, other situations can include when an entity (e.g., user, computer, machine, etc.) wishes to continue interaction with the service from a disparate device (e.g., from a mobile communication device while traveling, on a laptop while out of town, etc.).

In addition, the system 100 can include most any suitable and/or necessary interface component 106 (herein referred to as "interface 106"), which provides various adapters, connectors, channels, communication paths, etc. to integrate the hydrate component 102 into virtually any operating and/or database system(s) and/or with one another. In addition, the interface component 106 can provide various adapters, connectors, channels, communication paths, etc., that provide for interaction with the hydrate component 102, web applications 104, data, and any other device and/or component associated with the system 100.

In addition, the system can support a user desire to change the device in use for the web application and transition the application client to be from a disparate device. In one example, the device in use can be a desktop computer and the user may desire to move to a mobile device such as a handheld computer. Another example is where the device in use is running out of battery. Yet another example is where the best user interface for the web application is possible from a different device. In such scenarios, this design supports a hot transition of a live web application by using the system 100.

The system 100 can serialize the state of a computation and resume the computation by loading the serialized state. Furthermore, the hydrate component 102 can provide a redundancy-check in order to alleviate duplicate serialized state(s). For example, upon the serialization of the state of a computation and resuming such computation, the hydrate component 102 can employ most any suitable technique in order to ensure the integrity and/or accuracy of the serialized state. By employing an accuracy check on the serialization, the duplication of serialized state can be prevented, the spoof and/or modification of the serialized state can be prevented, and the serialized state is authenticated.

The hydrate component 102 can also implement a time-stamp associated with the serialization of state for data. In other words, the hydrate component 102 can provide a time and/or date in connection with when data was dehydrated and/or when such data should be re-hydrated. For example, portions of data may be time-sensitive, wherein the dehydration of such data and/or re-hydration of such data can be associated with time. Thus, a specific portion of data may be less helpful if re-hydrated after a specific deadline. Therefore, the hydrate component 102 can provide a time-stamp associated with portions of data, wherein the system 100 can evaluate and employ dehydration and/or re-hydration in accordance to such time-sensitive data.

Moreover, the hydrate component 102 can utilize relationship and/or links in connection with portions of resumed (e.g. re-hydrated) serialized data. In other words, the hydrate component 102 can resume two copies of a serialized computation and continue and/or maintain relationships, links, contexts, and the like. Thus, if two portions of data are dependent therewith, such dependency can exist prior to dehydration and also post re-hydration.

The system 100 can further employ serialized runtime state as a first class digital citizen. The hydrate component 102 can further employ licensing and/or digital rights management (DRM) to the data that can be de-hydrated, re-hydrated, and/or any state associated therewith. For instance, the hydrate component 102 can track data and/or any portions of data to ensure licensing and/or DRM characteristics are maintained such that the legalities of such data are intact. Thus, the hydrate component 102 can associate particular ownership rights to data and/or any respective state associated therewith. In other words, the hydrate component 102 can invoke rights to any portion of data within the system 100, wherein the rights can correspond to data and/or at least one state respective to the data. For example, the state of a particular portion of data can have a first ownership right, while a second state of the particular portion of data can have a second ownership right.

It is to be further appreciated that the hydrate component 102 can employ the serialization of runtime state to most any suitable virtual machine (e.g. a portion of software and/or application that enables a virtualized environment between a computer platform to allow an end user to utilize software and/or applications). For instance, a virtual machine (e.g., a virtual personal computer (PC), virtual machine software and/or applications, etc.) can allow the serialization of a complete state, duplicate the state, transfer the state, etc. For the sake of brevity, it is to be understood that the claimed subject matter can include the employment of a virtual machine in connection with the hydrate component 102, and/or any other suitable component related to the system 100.

Figure 2:
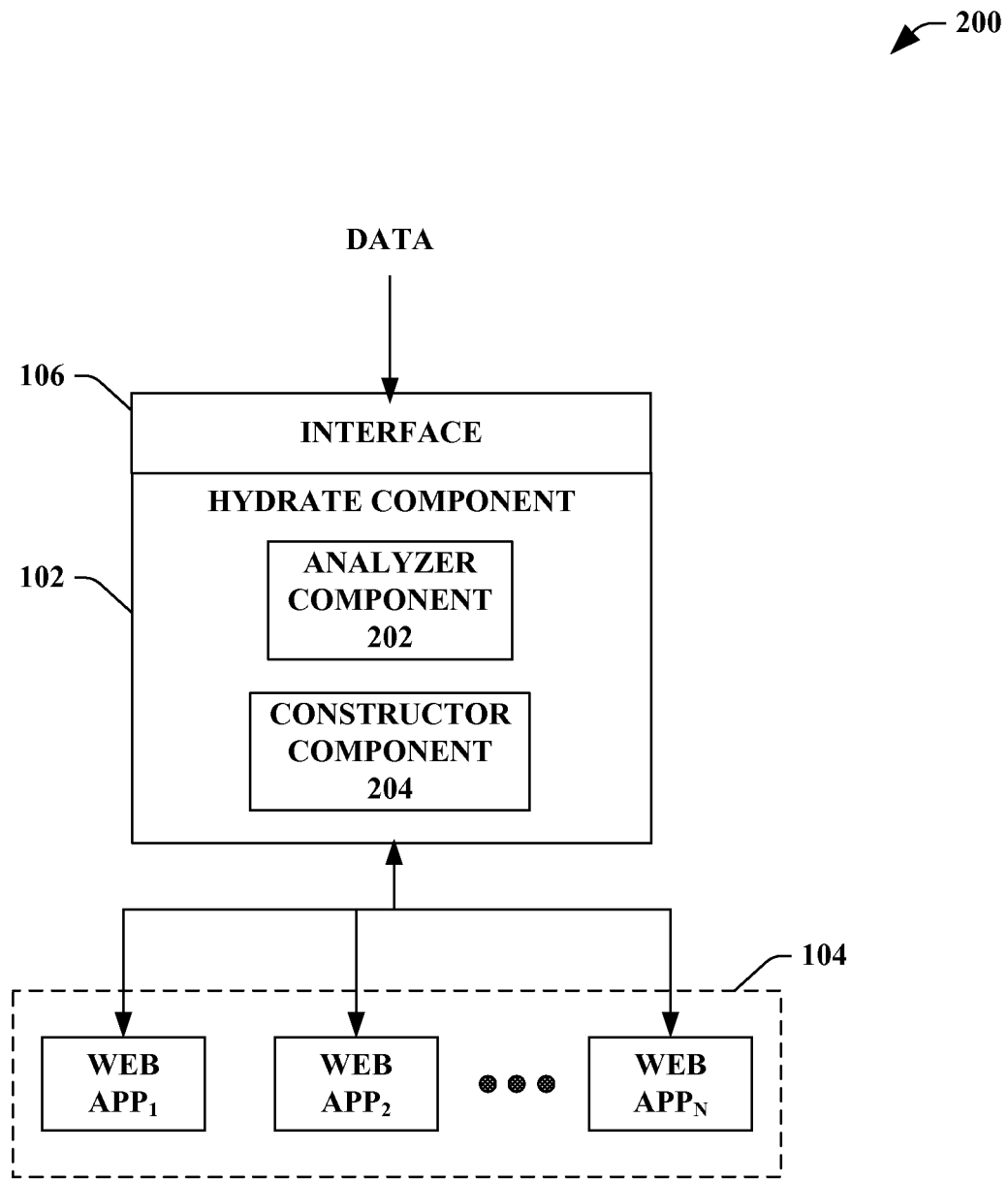
FIG. 2 illustrates a block diagram of an exemplary system that facilitates expanding a portion of serialized data associated with an application specification to execute a web application.

FIG. 2 illustrates a system 200 that facilitates expanding a portion of serialized data associated with an application specification to execute a web application. The system 200 can include the hydrate component 102 that can receive serialized data associated with an application specification to allow the implementation of a web application. It is to be appreciated that the hydrate component 102 can receive a plurality of serialized data, wherein portions can relate to respective web applications 104. Thus, a first set of serialized data can relate to a first web application while a second set of serialized data can relate to a second web application. In particular, the hydrate component 102 can expand the serialized data based on the fact that the serialized data can be a bare-bone and/or stream-lined portion of data that includes layers (e.g., database, web server, network server, rendering side, display, application layer, client side logic, server side logic, etc.) that allow the employment of a web application. In other words, the serialized data related to the application specification can be a compact, portable blueprint with transparent structure and state (related to the web application) that can be hydrated into a web application and de-hydrated back into the serialized data.

The hydrate component 102 can include an analyzer component 202 that evaluates data received via the interface 106. In particular, the analyzer component 202 can evaluate serialized data related to an application specification. For example, the analyzer component 202 can ascertain which portions of serialized data correspond to which particular web application. Thus, a collection of serialized data can be received via the interface 106 from, for instance, a plurality of network services that are terminating and/or terminated. The collection of serialized data can be evaluated by the analyzer component 202 to associate the portions of serialized data to corresponding web applications. In another example, the analyzer component 202 can determine the contents of the serialized data, various layers, and/or stream-lined blueprint data to facilitate hydration and/or expansion of such layers and/or data to a web application. For instance, the analyzer component 202 can identify portions of an application specification that correlate to a database, a web server, a framework, a web server, a network service, a rendering side, a display, an application layer, a client side logic, a server side logic, most any suitable data related to a web application, etc.

The hydrate component 102 can further include a constructor component 204 that can expand and/or hydrate the serialized data respective to an application specification to yield a web application. For instance, the constructor component 204 can implement and/or hydrate the serialized data based at least in part upon the evaluation ascertained by the analyzer component 202. Thus, upon evaluation of the serialized data, the constructor component 204 can append the serialized data and application specification with most any necessary data (e.g., linkage data between layers, network service specific data, cloud service specific data, framework specific data, structure data specific to a host of the web application, etc.) to create a web application.

Figure 3:
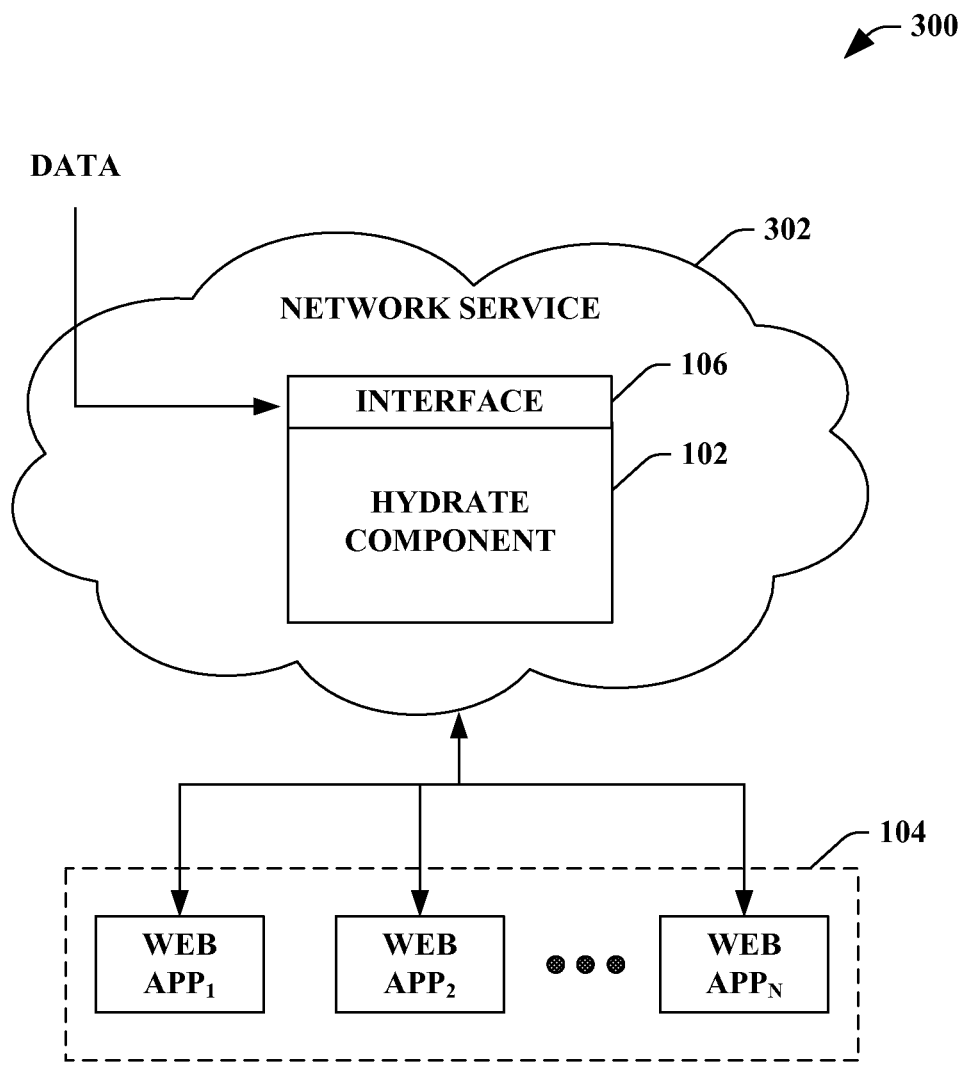
FIG. 3 illustrates a block diagram of an exemplary system that facilitates employing a web application within a network service utilizing transportable serialized data.

FIG. 3 illustrates a system 300 that facilitates employing a web application within a network service utilizing transportable serialized data. The system 300 can include the hydrate component 102 that expands a portion of serialized data and/or application specification to create a functional web application. The hydrate component 102 can construct the web application based at least in part upon the contents of received serialized data, wherein the serialized data relates to an application specification and is at least one of compact, transportable, stream-lined, including bare-bone layers associated with the web application, a blueprint for implementing the web application, having state associated with the web application, etc.

The hydrate component 102 can be utilized by a network service 302, wherein the hydrate component 102 is incorporated therein. Although the hydrate component 102 and the interface 106 are depicted within the network service 302, it is to be appreciated that the hydrate component 102 and capabilities associated therewith can be a stand-alone unit, incorporated into the network service 302 (as shown), and/or any combination thereof. For instance, serialized data related to an application specification can be received from outside the network service 302 and utilized by the hydrate component 102. In another example, the serialized data can be received by the hydrate component 102 and the expanded web application can be transmitted into the network service 302. Furthermore, the network service 302 can provide the web applications 104 to various clients, users, machines, etc.

In one example, the serialized data related to an application specification can be easily transported and utilized by most any suitable network service. For instance, a first network service and a second network service can have respective framework settings and/or configurations disparate to one another. Conventionally, each web application would have to be specifically tailored for a particular target host. However, utilizing the hydrate component 102, serialized data associated with an application specification can have a transparent structure and core essentials to allow the host (e.g., network service, cloud service, service, off-site party, third party, etc.) to implement a web application. Thus, the web application can be utilized by the first network service then dehydrated and transmitted to the second network service, where the web application can be re-hydrated and executed with state substantially similar before the dehydration.

In general, the network service 302 can refer to any collection of resources that are maintained by a party (e.g., off-site, on-site, third party, etc.) and accessible by an identified user over a network (e.g. Internet, WAN, etc.). It is to be appreciated and understood that the network service 302 is intended to include any service, network service, cloud service, collection of resources, etc. and can be accessed by an identified user via a network. Moreover, the network service 302 can provide any suitable number of web applications and services. In another example, the network service 302 can be a cloud service that can include and/or utilize the hydrate component 102.

Figure 4:
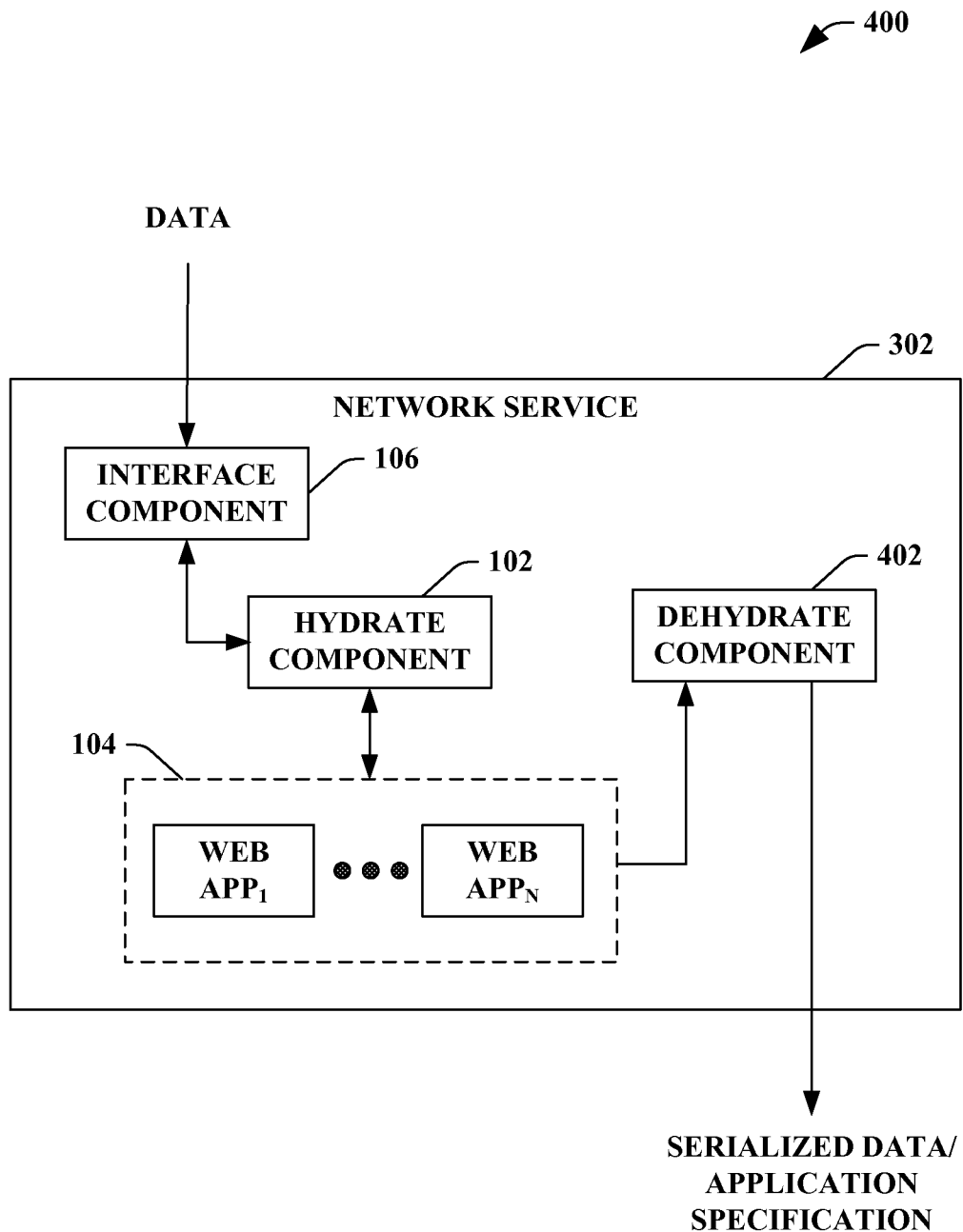
FIG. 4 illustrates a block diagram of an exemplary system that facilitates packing a web application into a portion of serialized data associated with an application specification for portability.

FIG. 4 illustrates a system 400 that facilitates packing a web application into a portion of serialized data associated with an application specification for portability. The system 400 can include the network service 302 that utilizes the hydrate component 102 to construct one or more web applications 104 based at least in part upon data received via the interface component 106. The data can be, but is not limited to being, a portion of serialized data related to an application specification, an object related to a programming language, a portion of stream-lined layers that maintain a bond to a web application, a portion of a web application, etc. Once received, the hydrate component 102 can append the barebones data with transparent structure to allow the corresponding web application to be implemented with state associated to the web application within the network service 302.

The system 400 can further include a dehydrate component 402 that can contract and/or compress a web application into a compact package of serialized data associated with an application specification that can include the bare minimum necessities to implement the web application. Moreover, the serialized data can be a transparent structure that can be transported to most any suitable entity for expansion and implementation such as, but not limited to, network service, cloud service, cloud, service, computer, component, machine, etc. In one example, the dehydrate component 402 can strip a web application of most any data specific to the particular network 302 so as to allow most any disparate network service expand and utilize the web application. For instance, the web application can be dehydrated to include a blueprint of general portions associated with the web application (e.g. serialized data related to an application specification) without most any framework specific data. Such stream-lined data can be transported to be utilized to a disparate host, wherein the stream-lined data (e.g., serialized data related to an application specification) can retain a state corresponding to the web application before the dehydration.

Figure 5:
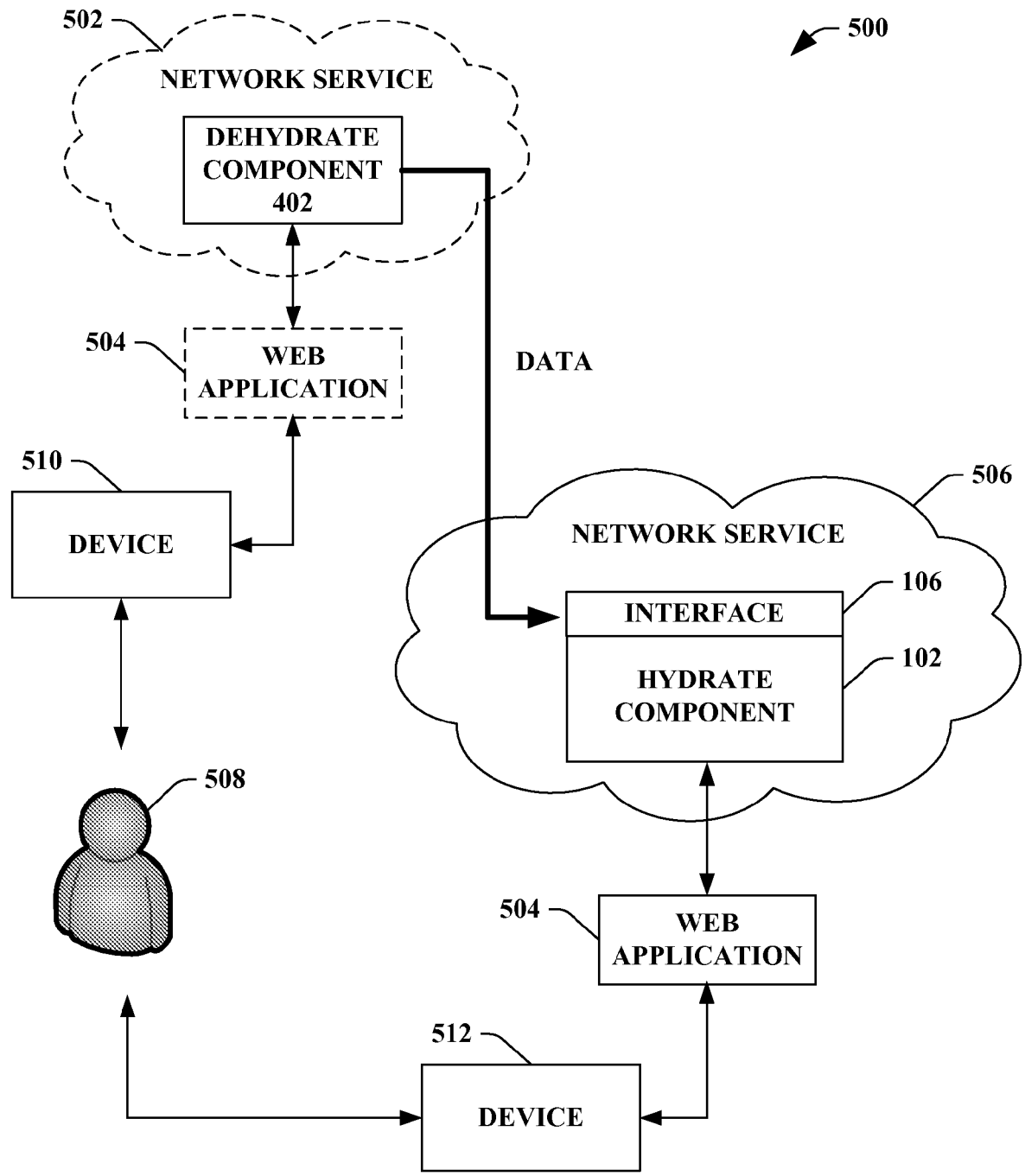
FIG. 5 illustrates a block diagram of an exemplary system that facilitates the migration of a web application to a disparate network service utilizing a portion of serialized data related to an application specification.

FIG. 5 illustrates a system 500 that facilitates the migration of a web application to a disparate network service utilizing a portion of serialized data related to an application specification. The system 500 illustrates the scenario that includes a plurality of network services, wherein at least one network service terminates and/or ceases to exist. In such a situation, various issues arise such as the abrupt interruption to most any users, clients, and/or machines utilizing and/or related to the terminating and/or terminated network service. Yet, the system 500 depicts the benefits of utilizing the claimed subject matter to mitigate most any problematic issues associated with a terminating and/or terminated network service.

In particular, the system 500 can include a terminating network service 502 that can be in the process of termination and/or completely terminated. The terminating network service 502 can provide various services to most any suitable entity such as a user, client, machine, etc. before the completion of termination and/or ceasing to exist. Moreover, the terminating network service 502 can provide a web application 504. The network service 502 can be terminating for most any suitable circumstance such as, but not limited to, a retirement, a bankruptcy, a buy-out, a dissolution, the network service dissolving, the network service terminated, the network service terminating, the network service dissolving, filing bankruptcy, a closing, a shut down, a strike, a buyout, the network service ceases to exist, a planned dissolution, a termination of services based on geography, a re-structuring, etc. Upon detection of termination, the network service 502 can employ the dehydrate component 402 to compact the web application 504 into stream-lined data package including application specification data without framework details (e.g. data respective to the network service 502). In other words, the dehydrate component 402 can compress the web application (and current state) to a portion of serialized data related to an application specification to transmit and/or transport to a disparate host.

The network service 502 can identify a suitable replacement network service utilizing most any suitable matching techniques implementing characteristics such as services provided, network services, user request, client desires, network service concerns, account data, user data, web application similarities, etc. Upon identifying a suitable replacement network service, the serialized data can be received to allow implementation and execution of the web application 504. Thus, the serialized data associated with an application specification can be received by the interface component 106, wherein the hydrate component 102 can expand and execute the web application 504 within a network service 506. The web application 504 can have the same state previous to dehydration allowing uninterrupted implementation of the web application 504 and seamless transition between the network service 502 (the terminating network service) to the network service 506 (the replacement network service).

In another example, a user can subscribe to a network service 502 that provides word processing applications (e.g. a web application 504). Based on circumstances known and/or unforeseen (e.g., planned dissolution, filing bankruptcy, retiring, a buyout, a termination of services based on geography, etc.), the network service 502 can die and/or cease to exist. In such a scenario, the system 500 can facilitate maintaining at least a portion of web application 504 by relocating the web application 504 to a disparate network service 506 utilizing dehydration and re-hydration techniques implemented by the system 500. A replacement network service 506 can be identified and/or created (discussed infra), wherein such replacement network service 506 can implement the web application 504 from the terminated network service 502. By re-hydrating the serialized data associated with the application specification, the replacement network 506 allows the web application 504 (e.g. word processing application) to be provided by the replacement network service 506 in a seamless and continuous manner.

Furthermore, the system 500 can utilize most any suitable rollback techniques that allow the rollback to a state associated with a point in the past. For example, the web application 504 can be at a first state associated with a first time, wherein the web application 504 can be dehydrated, sent to a disparate network service, re-hydrated and the executed. However, the system 500 can utilize rollback techniques that allow the web application 504 to be rolled back to a disparate state associated with a time earlier than the first time. Moreover, a roll-forward technique can be employed with the system 500. Thus, if the system 500 is rolled back to a previous state and/or point, the system 500 can be rolled forward to a point that is later than the previous state and/or point.

In still another example, the system 500 can support migration of the web application 504 based at least in part upon a client 508 and/or a client preference. For instance, the client 508 and/or user can utilize a first device 510 to implement the web application 508. However, due to client choice and/or other web application termination circumstances, the client can move the web application 504 to a disparate device 512. For instance, the first device can be a desktop computer, wherein the user/client may want to utilize a hand-held computer to view/employ the web application 504. In another example, the first device may have a mechanical error and/or be sick, wherein the user/client would move the web application 504 to the disparate device 512. In still another example, the user/client can migrate data from the first device 510 because of a low battery. Moreover, the disparate device 512 may be the optimal device to view/employ the web application 504 in comparison to the first device 510. In other words, the system 500 can enable a hot transition of a live web application 504 by implementing the dehydration component 402 and the hydration component 102. It is to be appreciated that the first device 510 and the second device 512 can be a mobile communication device, a cellular phone, a portable digital assistant (PDA), a messenger device, a smartphone, any suitable device utilized to implement a web application, etc.

In another example, the system 500 can analyze technical and/or mechanical conditions associated with the first device 510 and/or network service 502 to anticipate data and/or web application migration. In yet another instance, the system 500 can provide a health indicator component (not shown) that can be utilized to inspect the health of the system 500. Thus, the health indicator component can inspect a disk to ascertain that such disk is becoming increasingly faultier and such disk should be replaced and/or removed from the network service 502. It is to be appreciated that the health indicator component can provide such health and/or life details associated with the network much like a battery meter on a laptop and/or a gas meter on a car, wherein both can indicate a life expectancy that will need replenishing and/or serviced.

Figure 6:
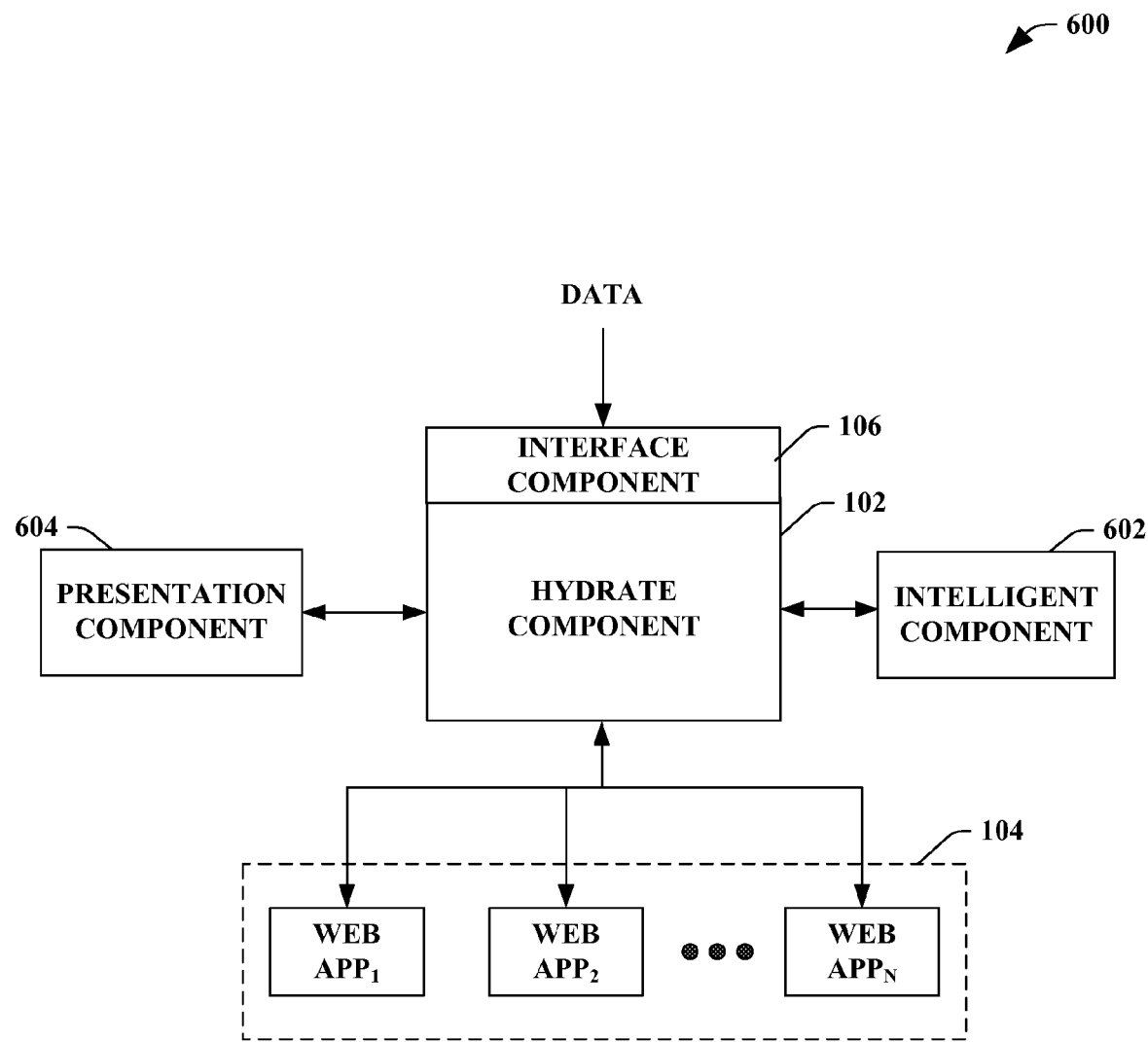
FIG. 6 illustrates a block diagram of an exemplary system that facilitates implementing a web application based on a portion of serialized data allowing the web application to be transportable.

FIG. 6 illustrates a system 600 that employs intelligence to facilitate implementing a web application based on a portion of serialized data allowing the web application to be transportable. The system 600 can include the hydrate component 102, web applications 104, and the interface component 106, which can be substantially similar to respective components and interface components described in previous figures. The system 600 further includes an intelligent component 602. The intelligent component 602 can be utilized by the hydrate component 102 to facilitate implementing a transportable web application utilizing a portion of serialized data associated with an application specification. For example, the intelligent component 602 can infer the creation of a web application, the serialized data associated with an application specification, a portion of the serialized data, portions of the web application (e.g., database, web server, rendering side, application layer, client side logic, server side logic, etc.), expansion techniques, settings associated with the web application, network service configurations, dehydration data, data associated with a replacing network service, transportation data, web application data, security information, bond maintenance for web application, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The hydrate component 102 can further utilize a presentation component 604 that provides various types of user interfaces to facilitate interaction between a user and any component coupled to the hydrate component 102. As depicted, the presentation component 604 is a separate entity that can be utilized with the hydrate component 102. However, it is to be appreciated that the presentation component 604 and/or similar view components can be incorporated into the hydrate component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the hydrate component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
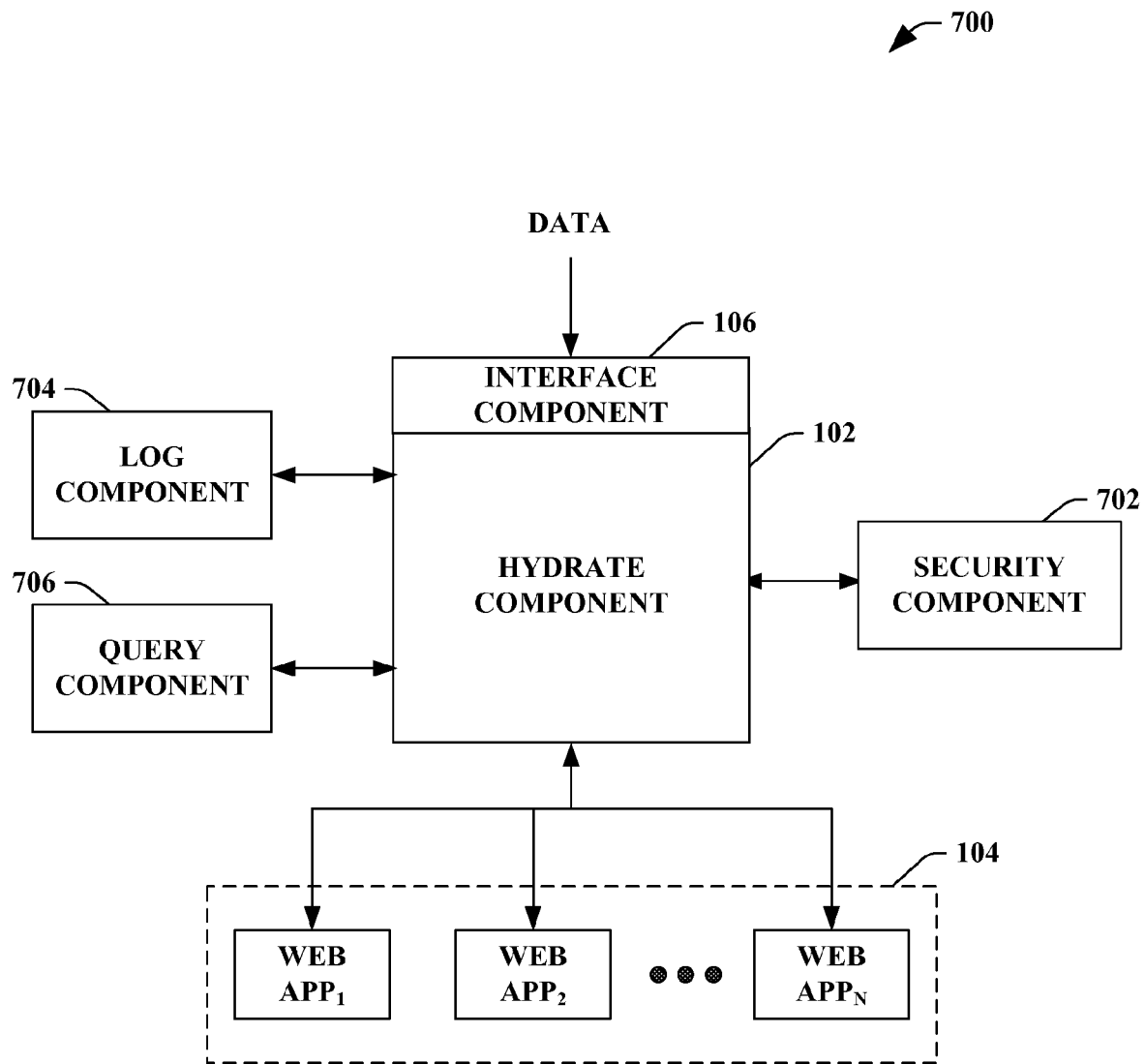
FIG. 7 illustrates a block diagram of an exemplary system that facilitates expanding a portion of serialized data associated with an application specification to execute a web application.

FIG. 7 illustrates a system 700 that facilitates expanding a portion of serialized data associated with an application specification to execute a web application. The system 700 can include a security component 702 that can ascertain which operations related are authorized to manipulate and/or execute. In accordance with one example, a user may only be authorized to perform a certain creation of a portion of a web application, while not authorized to initiate a creation of a disparate portion of a web application. In another example, a user may be able to initiate a dehydration of a portion of a web application, while not authorized to initiate dehydration for a disparate portion of a disparate web application. In addition, the user may be able to relocate a portion of serialized data, while not authorized to relocate a disparate portion of serialized data. The security component 702 can determine identity of a user by analyzing, for instance, usernames, passwords, personal identification numbers, personal status, management positions, occupation hierarchy, and the like. Furthermore, the security component 702 can determine a user's identity by analyzing biometric indicia, such as voice recognition, fingerprint analysis, retina analysis, etc. By providing identification of a user, specific rights can be attached and/or associated therewith to allow a hierarchical rights structure to protect the integrity of any data and/or data manipulation associated with the system 700.

Still further, the security component 702 can perform granular security with respect to a user, a portion of a network service, a collection of services, a user account, a network service, a cloud service, a service, etc. Pursuant to one example, a user's rights with respect to a particular web application can change as time alters. For instance, certain operations associated with a web application performed by a user can be allowable by the user during a first shift but not allowable to the user during a second shift. Additionally, the security component 702 can provide different measures of security given different states of data migration, web application re-location, dehydration, re-hydration, and/or web application expansion process. Therefore, for example, a user may have rights with respect to performing a data migration in a first state of the web application dehydration/hydration/re-hydration but may have different rights with respect to the same operation in a second state of the dehydration/hydration/re-hydration.

The system 700 can further include a log component 704 that can work in conjunction with the hydrate component 102, web applications 104, any existing network service (not shown), the interface component 106, the security component 702, and/or any combination thereof in order to track any data related to the system 700. For instance, the log component 704 can track and/or record data related to serialized data, hydration settings, web application packaging, web application construction, network services, transportation data, user accounts, web application data, serialization of state related to the web application upon termination, web application re-location, web application target destinations, etc. Moreover, the log component 704 can track various user data in connection with most any security and/or authorization utilized with the system 700. In such a case, the log component 704 can track which particular user initiated a specific data migration and/or web application re-assignment.

Moreover, the system 700 can include a query component 706 that allows the querying of such data stored and/or logged. In other words, the query component 706 can allow a user to search most any data associated with the system 700. In particular, a particular web application can be identified and/or most any other data related thereto. Moreover, network services can be queried to locate the migration location of data and/or relocation of web applications (e.g. identifying the particular replacement network service). In still another example, the system 700 can be queried to locate a specific and/or particular user and/or users.

The system 700 can further include a data store (not shown) that can include any suitable data related to the hydrate component 102, web applications 104, a network service (not shown), the interface component 106, etc. For example, the data store that can include, but not limited to including, serialized data, application specifications, web applications, network service locations, user account information, data migration configurations, security settings, user data, financial records, historic data, service data, network service summarization data, etc. In one example, the hydrate component 102 can store serialized data associated with a web application within the network service and utilize such data to transport such web application to an analogous network service, wherein data and/or web applications can be re-assigned to the analogous network service.

It is to be appreciated that the data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, and the like.

Figure 8:
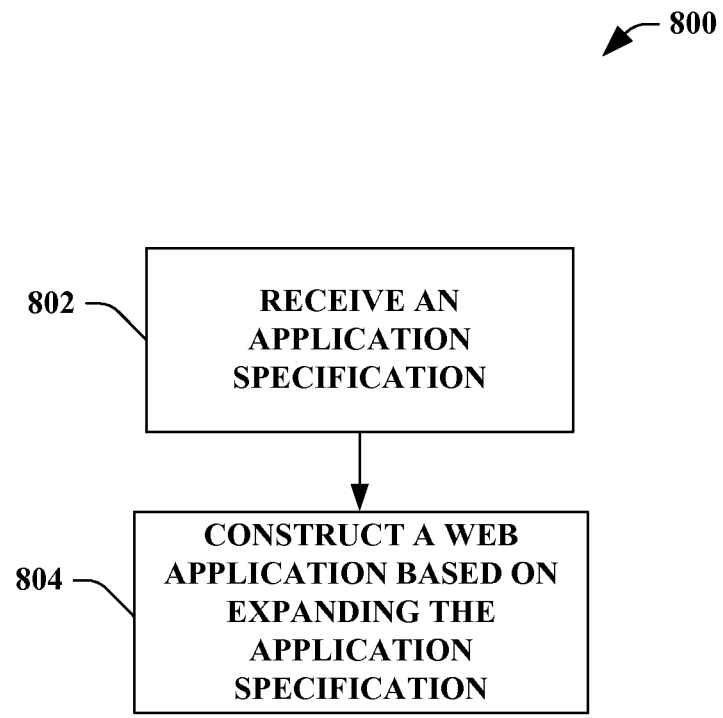
FIG. 8 illustrates an exemplary methodology for implementing a web application based on a portion of serialized data allowing the web application to be transportable.
Figure 9:
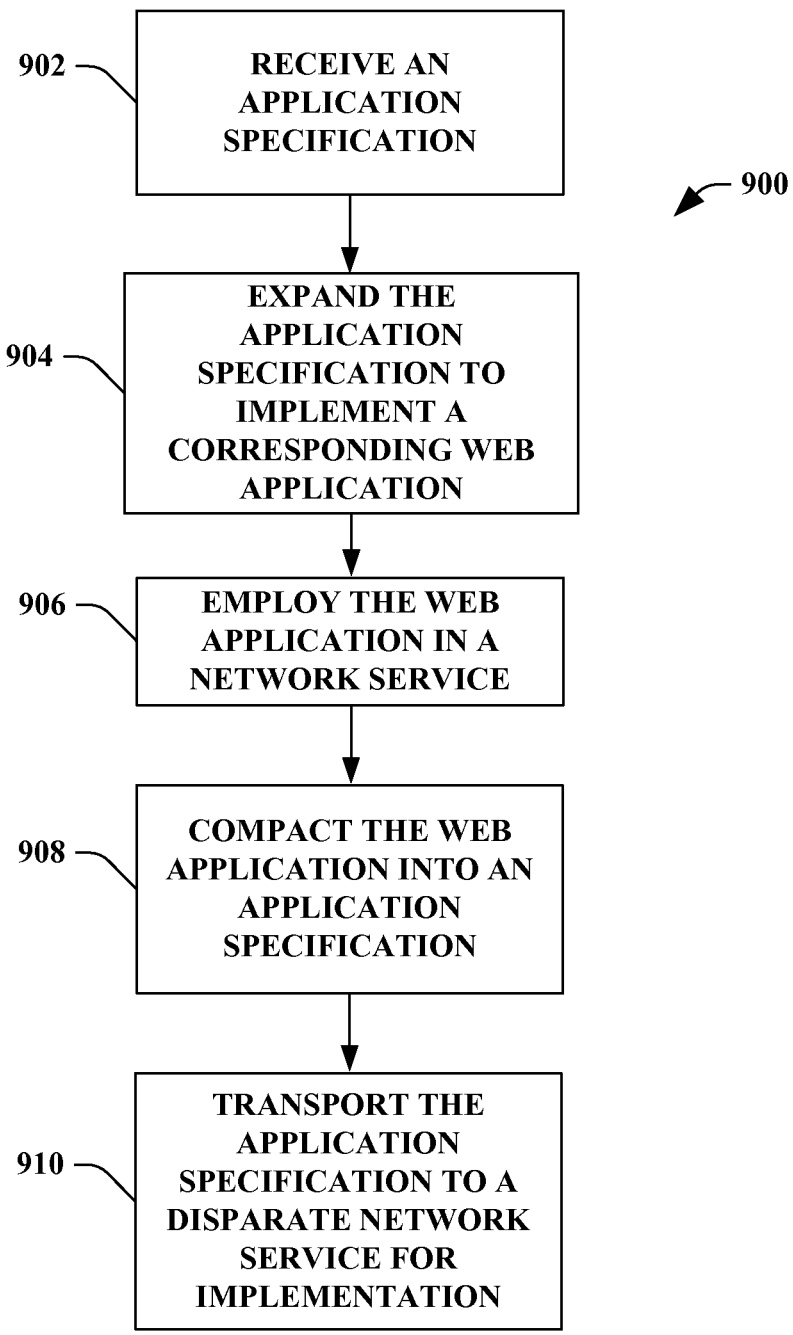
FIG. 9 illustrates an exemplary methodology for packing a web application into a portion of serialized data associated with an application specification for portability.
Figure 10:
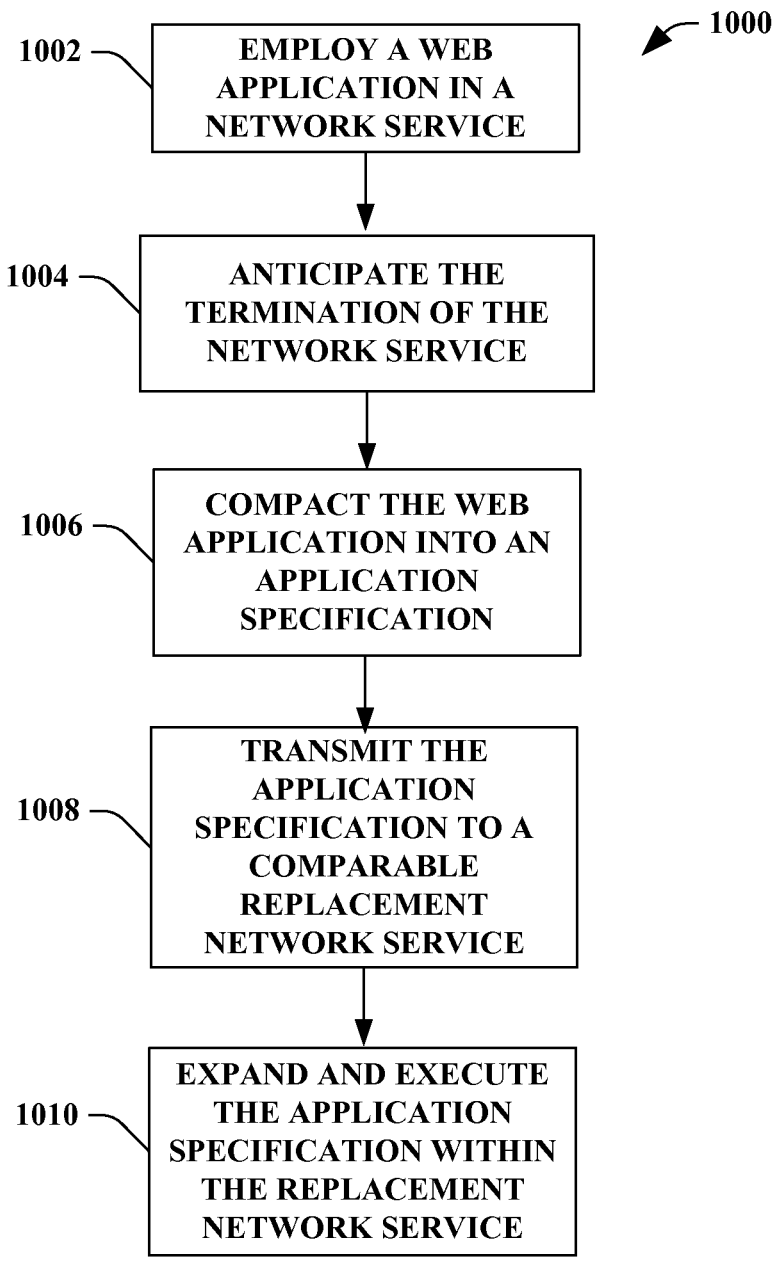
FIG. 10 illustrates an exemplary methodology that facilitates the migration of a web application to a disparate network service utilizing a portion of serialized data related to an application specification.

FIGS. 8-10 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for implementing a web application based on a portion of serialized data allowing the web application to be transportable. At reference numeral 802, an application specification can be received. The application specification can be serialized data, wherein the specification includes any necessary data to employ a web application yet stream-lined to not include any specific details associated with a particular framework, host, network service, cloud service, etc. In other words, the application specification can be a transparent structure that can be implemented by any suitable host such that details and configuration specifics can be provided by the particular host. Thus, the serialized data that corresponds to the web application (based on the application specification) can include various layers that are necessary for the web application to be employed. For instance, the layers can be, but are not limited to being, related to database, web server, rendering side, display, application layer, client side logic, server side logic, etc. It is to be appreciated that the application specification can be, but is not limited to being, a portion of serialized data related to an application specification, an object related to a programming language, a portion of stream-lined layers that maintain a bond to a web application, a portion of a web application, etc.

At reference numeral 804, a web application can be constructed by expanding the application specification. The expansion and/or hydration can include appending the core and/or bare-bone structure (e.g., the serialized data related to the application specification) to provide any specific and/or particular data necessary (e.g., linkage data between layers, network service specific data, cloud service specific data, framework specific data, structure data specific to a host of the web application, etc.) to create a web application in a host. In other words, the serialized data that corresponds to the web application can include various layers that are necessary for the web application to be employed, yet still be independent of any particular host to allow for versatility in deployment and/or implementation.

The method 800 facilitates serializing the state of an application specification to enable seamless integration and/or exportation to various parties (e.g., off-site party, third party, etc.), while retaining the state of the web application. For example, an application specification and/or serialized data associated therewith can be expanded by an off-site party to provide execution and state within, for instance, a database. After the expansion, execution, and retention of state within the database and/or off-site party, the data can be contracted/packed/de-hydrated for exportation to a disparate off-site party. In other words, an application specification can be de-hydrated and re-hydrated by a third party to provide the web application in the same state that the web application had left-off.

Furthermore, the method 800 allows separation of process (e.g., of the web application) from limitation such that data (e.g., application specification, serialized data, etc.) can be hydrated and dehydrated seamlessly between disparate parties regardless of the various disparities (e.g., framework differences, programming language implemented, settings, configurations, etc.) associated therewith. The process can be separated from limitation utilizing serialized data that maintains a bond to enable implementation of a particular web application. Moreover, the application specification can include portions associated with generic details related to a database, a web server, a rendering side, a display, an application layer, a client-side logic, a server-side logic, a policy associated with business, etc., wherein such application specification can be a database with transparent structure. By employing such transparent structure, the application specification can be exported, imported, and/or utilized by various parties, clients, and/or systems regardless of any respective differences.

FIG. 9 illustrates a methodology 900 for packing a web application into a portion of serialized data associated with an application specification for portability. At reference numeral 902, an application specification can be received. The application specification can be related to serialized data, wherein the application specification can include be a transparent structure with generic details and/or layers associated with a database, a web server, a rendering side, a display, an application layer, a client side logic, a server side logic, etc. In other words, the serialized data related to the application specification can be a compact, portable blueprint with transparent structure and state (related to the web application) that can be hydrated into a web application and de-hydrated back into the serialized data.

At reference numeral 904, the application specification can be expanded to implement a corresponding web application. The serialized data and application specification can be appended and/or expanded with any necessary data (e.g., linkage data between layers, network service specific data, cloud service specific data, framework specific data, structure data specific to a host of the web application, etc.) to create the web application. At reference numeral 906, the web application can be employed in a network service.

In general, the network service can refer to any collection of resources that are maintained by a party (e.g. off-site, on-site, third party, etc.) and accessible by an identified user over a network (e.g., Internet, WAN, etc.). It is to be appreciated and understood that the network service is intended to include any service, network service, cloud service, collection of resources, etc. and can be accessed by an identified user via a network. Moreover, the network service can provide any suitable number of web applications and services. In another example, the network service can be a cloud service that can include and/or utilize the web application.

At reference numeral 908, the web application can be compacted into an application specification. For instance, the web application can be dehydrated into a compact and transportable structure that is transparent and lacking any specific details associated with a target host and/or deployment environment. At reference numeral 910, the application specification can be transported to a disparate network service for implementation. In one example, the web application can be stripped of any data specific to the particular network so as to allow any disparate network service expand and utilize the web application. For instance, the web application can be dehydrated to include a blueprint of general portions associated with the web applications (e.g., serialized data related to an application specification) without any framework specific data. Such stream-lined data can be transported to be utilized to a disparate host, service, cloud, network, machine, user, entity, etc.

FIG. 10 illustrates a methodology 1000 that facilitates the migration of a web application to a disparate network service utilizing a portion of serialized data related to an application specification. At reference numeral 1002, a web application can be employed in a network service. In general, the network service can refer to any collection of resources that are maintained by a party (e.g. off-site, on-site, third party, etc.) and accessible by an identified user over a network (e.g., Internet, WAN, etc.). It is to be appreciated and understood that the network service is intended to include any service, network service, cloud service, collection of resources, etc. and can be accessed by an identified user via a network. At reference numeral 1004, the termination of the network service can be detected and/or anticipated. For instance, the termination of the network service can be, but is not limited to being, a retirement, a bankruptcy, a buy-out, a dissolution, the network service dissolving, the network service terminated, the network service terminating, the network service dissolving, filing bankruptcy, a closing, a shut down, a strike, a buyout, the network service ceases to exist, a planned dissolution, a termination of services based on geography, a re-structuring, etc.

At reference numeral 1006, the web application can be compacted into portion of serialized data associated with an application specification based at least in part upon the anticipation and/or detection of the network service terminating. For instance, the web application can be dehydrated (e.g., contracted, compacted, shrunk, packed, compressed, stripped, etc.) to include a blueprint of general portions associated with the web applications (e.g., serialized data related to an application specification) without any framework specific data. At reference numeral 1008, the serialized data associated with the application specification can be transmitted to a comparable (in reference to the terminating network service) replacement network service. Thus, the stream-lined data can be transported to be utilized to a disparate yet comparable host, wherein the stream-lined data (e.g. serialized data related to an application specification) can retain a state corresponding to the web application before the dehydration. At reference numeral 1010, the application specification and related serialized data can be expanded and executed within the replacement network service. The web application can be executed with the same state prior to dehydration. Thus, the web application is uninterrupted and provided to clients, users, machines, and the like in a seamless manner.

Figure 11:
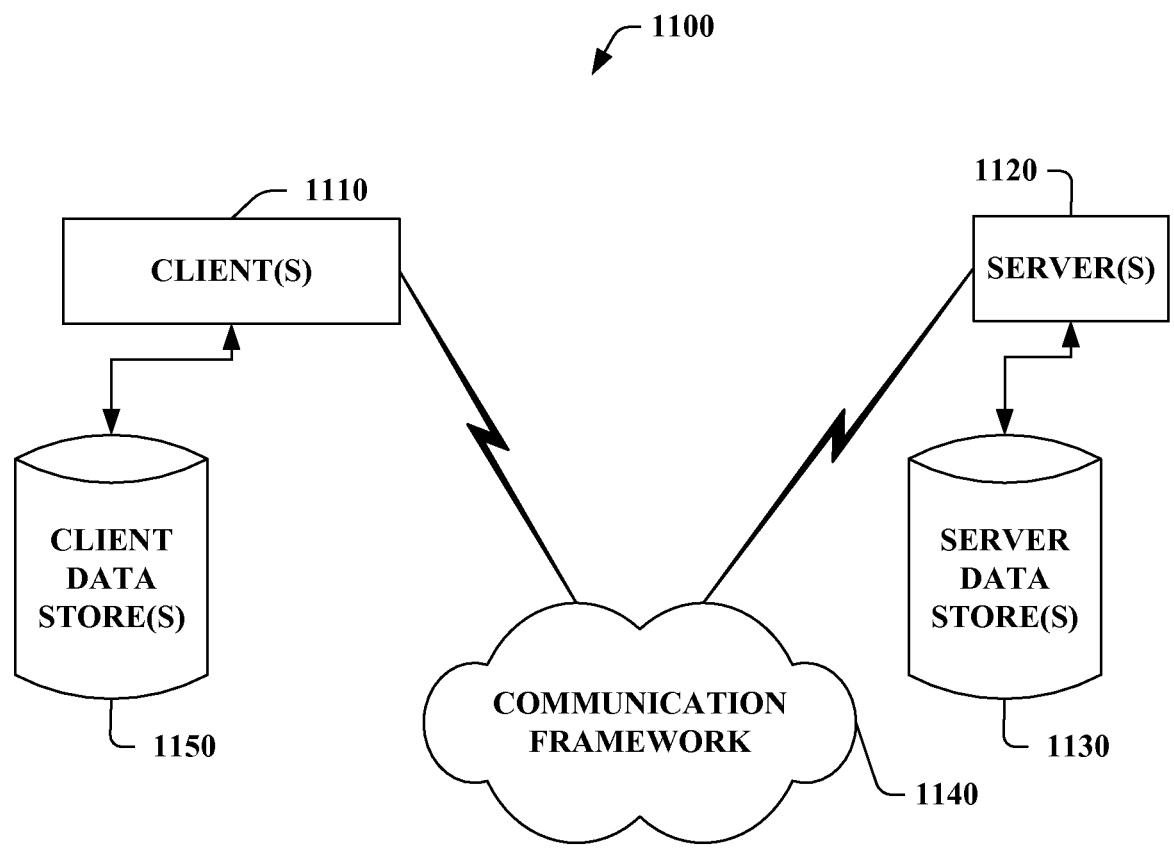
FIG. 11 illustrates an exemplary networking environment, wherein the novel aspects of the claimed subject matter can be employed.
Figure 12:
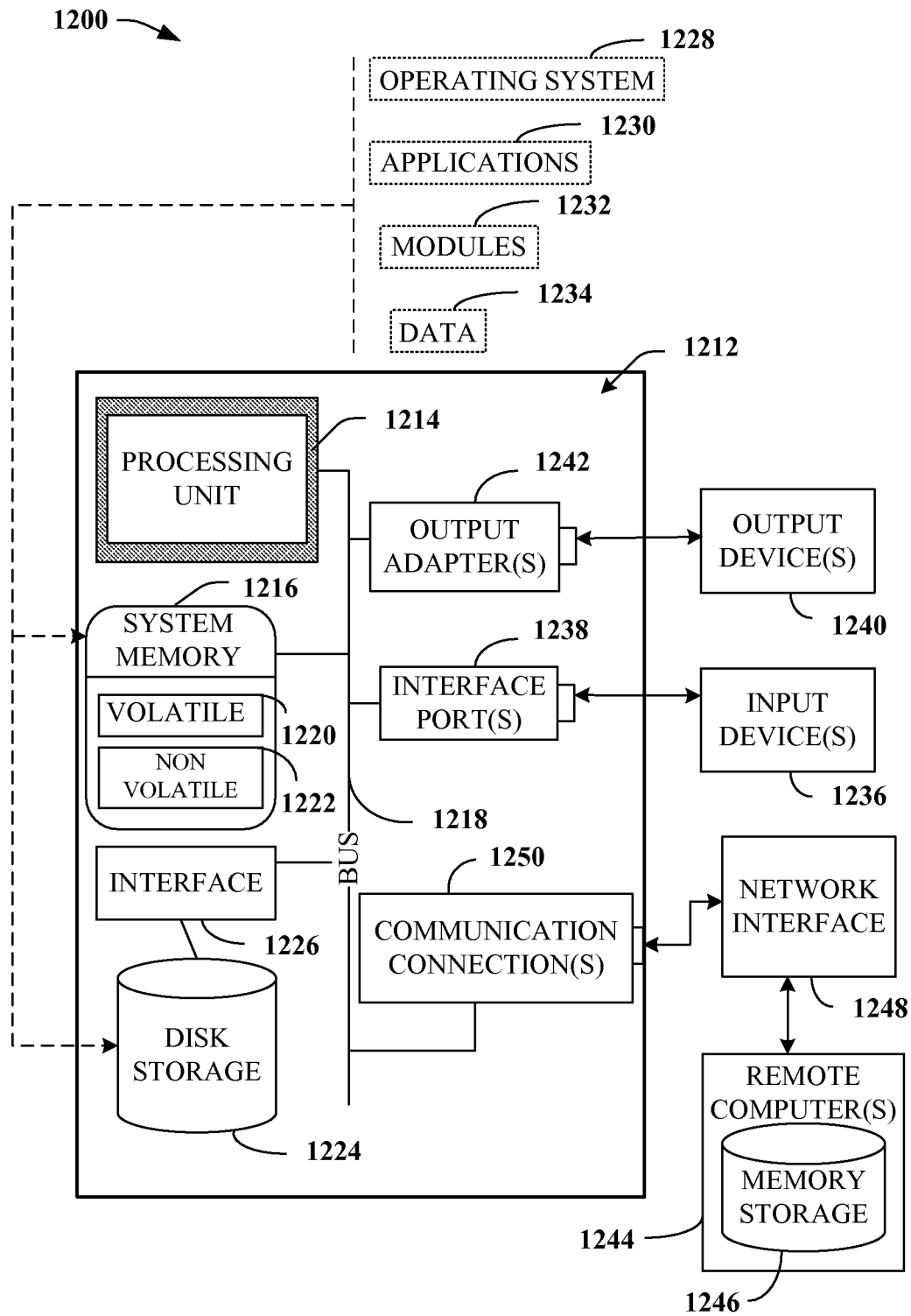
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, a hydrate component that facilitates creating a web application based on an application specification to allow efficient implementation in a network service, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1140 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1294), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates implementing a transportable web application that is to be transported from a first device to a second device, the system comprising:
   one or more hardware processors;
   at least one computer readable storage media;
   a dehydrate component maintained by the at least one computer readable storage media that, when executed by the one or more processors, compresses a live web application operating on the first device into a compact package including a portion of serialized data with transparent structure related to an application specification, the serialized data being independent of at least one of a host and a network service, the compact package being generated such that the second device to which the web application is transported may decompress the compact package and such that the second device provides an uninterrupted implementation of the web application in place of the first device with the same state as before transportation from the first device to the second device; and
   an interface that transmits the compact package to the second device.

2. The system of claim 1, wherein the first device and the second device are at least one of a machine, a portable digital assistant (PDA), a mobile communication device, a laptop, a computer, a desktop machine, a smartphone, a cellular phone, and a messenger device.

3. The system of claim 1, wherein the first device comprises at least part of the interface.

4. The system of claim 1, wherein the first device and the second device are at least one of a network service, a resource that is maintained by a party and accessible by an identified user over a network, a cloud service, a cloud, a service, a computer, a component, and a machine.

5. The system of claim 1, further comprising a log component that tracks data associated with at least one of serialized data, a de-hydration setting, a hydration setting, a web application packaging, a web application construction, a network service, transportation data, a user account, web application data, a serialization of state related to the web application upon termination, a web application re-location, and a web application target destination.

6. The system of claim 1, further comprising a security component that employs granular security related to at least one of a user, a portion of a network service, a collection of services, a user account, a network service, a cloud service, a service, a state of data migration, a web application re-location, a dehydration, a re-hydration, and a web application expansion process.

7. The system of claim 1, further comprising a query component that allows the querying of data related to at least one of a network service, a service, a location of data, a location of a service, a relocation of a service, a relocation of data, a location of a web application, a re-location of a web application, a device utilizing a web application, a user associated with the network service, and a user associated with a device utilizing the web application.

8. The system of claim 1, further comprising an intelligent component that infers at least one of a creation of the web application, a serialized data associated with an application specification, a portion of the serialized data, portions of the web application, an expansion technique, a setting associated with the web application, a network service configuration, dehydration data, data associated with a replacing network service, transportation data, web application data, security information, and a bond maintenance for web application.

9. The system of claim 1, wherein the web application is implemented within a network service and retains state within the network service; and wherein the network service is a resource that is maintained by a party and accessible by an identified user over a network.

10. The system of claim 9, wherein the party is at least one of a third-party, a second-party, and an off-site party.

11. The system of claim 1, wherein the serialized data related to an application specification is at least one of a portion of data including user identification, a portion of data associated with user state, a portion of data related to a session state, an object related to a programming language, a portion of stream-lined layers that maintain a bond to the web application, a portion of the web application, a collection of bare-bone layers associated with the web application independent of a target host, and a blueprint for implementing the web application without data specifics associated with the network service.

12. The system of claim 1, wherein the serialized data related to an application corresponds to the web application and includes at least one layer, wherein the at least one layer relates to at least one of a database, a web server, a rendering side, a display, an application layer, a client side logic, and a server side logic.

13. A computer-implemented method comprising:
   at a first device utilizing a web application, the first device being a mobile communication device:
      compacting the web application into a compressed package including a portion of serialized data associated with an application specification, the serialized data being configured to ensure that digital rights management (DRM) characteristics are maintained, wherein the compacting is performed while the web application is live, the web application being compacted into the compressed package such that a hot transition of the web application to a second device may be facilitated such that the web application may be implemented by the second device in place of the first device in the same state as prior to the compaction and transition of the web application from the first device to the second device, the serialized data being independent of at least one of a host and a network service; and
      transmitting the compressed package from the first device to the second device;
   at the second device:
      hydrating the compressed package into the web application that is employed within the second device independent of network service details and independent of device specific details;
      implementing the web application by the second device in place of the first device in the same state as prior to the compaction.

14. The method of claim 13, further comprising:
   appending the application specification with data specific to at least one of the first device and the network service to allow implementation of the web application corresponding to the application specification.

15. The method of claim 13, wherein the mobile communication devices includes at least one of a portable digital assistant (PDA), a laptop, a computer, a desktop machine, a smartphone, a cellular phone, and a messenger device.

16. A computer-implemented system that facilitates transportation of a live web application from a first device to a second device, the computer-implemented system comprising:
- at the second device, an interface that receives a compact package from the first device, the compact package including a portion of serialized data with transparent structure related to an application specification of the live web application, the serialized data being independent of at least one of a host and a network service, the compact package being generated such that the second device to which the live web application is transported may provide an uninterrupted implementation of the live web application in place of the first device with the same state as before transportation from the first device to the second device; and
- a hydrate component that expands the live web application from the received compact package based at least in part upon the serialized data with transparent structure related to an application specification of the live web application and that executes the live web application at the second device such that the second device provides an uninterrupted implementation of the live web application in place of the first device with the same state as before transportation from the first device to the second device to achieve a hot transition of the live web application to the second device.

* * * * *